United States Patent
Sakabe

(10) Patent No.: US 10,009,513 B2
(45) Date of Patent: Jun. 26, 2018

(54) ELECTRONIC DEVICE THAT ENSURES IMPROVING SECURITY PERFORMANCE AND RECORDING MEDIUM THEREFOR

(71) Applicant: KYOCERA Document Solutions Inc., Osaka (JP)

(72) Inventor: Keiji Sakabe, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days. days.

(21) Appl. No.: 15/671,861

(22) Filed: Aug. 8, 2017

(65) Prior Publication Data

US 2018/0091698 A1   Mar. 29, 2018

(30) Foreign Application Priority Data

Sep. 28, 2016 (JP) ................. 2016-189154
Sep. 28, 2016 (JP) ................. 2016-189155

(51) Int. Cl.
 *G06K 15/00* (2006.01)
 *H04N 1/44* (2006.01)
 *H04N 1/327* (2006.01)

(52) U.S. Cl.
 CPC ....... *H04N 1/4433* (2013.01); *H04N 1/32776* (2013.01); *H04N 1/4426* (2013.01); *H04N 2201/0055* (2013.01); *H04N 2201/0094* (2013.01)

(58) Field of Classification Search
 CPC . H04N 1/4433; H04N 1/32776; H04N 1/4426
 USPC .................................................. 358/1.14
 See application file for complete search history.

(56) References Cited

U.S. PATENT DOCUMENTS

| | | | |
|---|---|---|---|
| 2013/0057898 A1* | 3/2013 | Park | H04L 63/10 358/1.14 |
| 2013/0215446 A1* | 8/2013 | Imai | H04N 1/4426 358/1.13 |
| 2015/0281959 A1 | 10/2015 | Yokota et al. | 12/8 |
| 2016/0269591 A1* | 9/2016 | Morishita | H04N 1/00307 |

FOREIGN PATENT DOCUMENTS

JP   2015-194937 A   11/2015

\* cited by examiner

*Primary Examiner* — Neil R McLean
(74) *Attorney, Agent, or Firm* — Stein IP, LLC

(57) ABSTRACT

An electronic device includes a wireless-connection-establishment unit and a function execution unit. The wireless-connection-establishment unit establishes a directly communicable wireless connection with another device. The function execution unit executes a function. The function execution unit executes the function requested from the other device via the wireless connection when a radio field intensity of the wireless connection established with the other device by the wireless-connection-establishment unit is equal to or more than a specified radio field intensity, and rejects execution of the function requested from the other device via the wireless connection when the radio field intensity of the wireless connection established with the other device by the wireless-connection-establishment unit is less than the specified radio field intensity.

7 Claims, 11 Drawing Sheets

27b

| Radio Field Intensity | Execution-Permitted Function |
|---|---|
| Weak Intensity | None |
| Medium Intensity | Setting Change |
| Strong Intensity | All |

27c

| Execution of Authentication | Function |
|---|---|
| No | Network Reboot Device Reboot |
| Yes | Functions Other Than the Above |

ELECTRONIC DEVICE THAT ENSURES IMPROVING SECURITY PERFORMANCE AND RECORDING MEDIUM THEREFOR

INCORPORATION BY REFERENCE

This application is based upon, and claims the benefit of priority from, corresponding Japanese Patent Application Nos. 2016-189154 and 2016-189155, each filed in the Japan Patent Office on Sep. 28, 2016, the entire contents of which are incorporated herein by reference.

BACKGROUND

Unless otherwise indicated herein, the description in this section is not prior art to the claims in this application and is not admitted to be prior art by inclusion in this section.

There is known a server that configures a distribution function of an application effective to a user terminal as a typical electronic device that determines whether to execute a function or not based on a radio field intensity of a directly communicable wireless connection established with other devices. The server configures a distribution function of an application effective to a user terminal when the radio field intensity of the directly communicable wireless connection established with other servers is within a specified range at boost of the server itself.

SUMMARY

An electronic device according to an aspect of the disclosure includes a wireless-connection-establishment unit and a function execution unit. The wireless-connection-establishment unit establishes a directly communicable wireless connection with another device. The function execution unit executes a function. The function execution unit executes the function requested from the other device via the wireless connection when a radio field intensity of the wireless connection established with the other device by the wireless-connection-establishment unit is equal to or more than a specified radio field intensity, and rejects execution of the function requested from the other device via the wireless connection when the radio field intensity of the wireless connection established with the other device by the wireless-connection-establishment unit is less than the specified radio field intensity.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
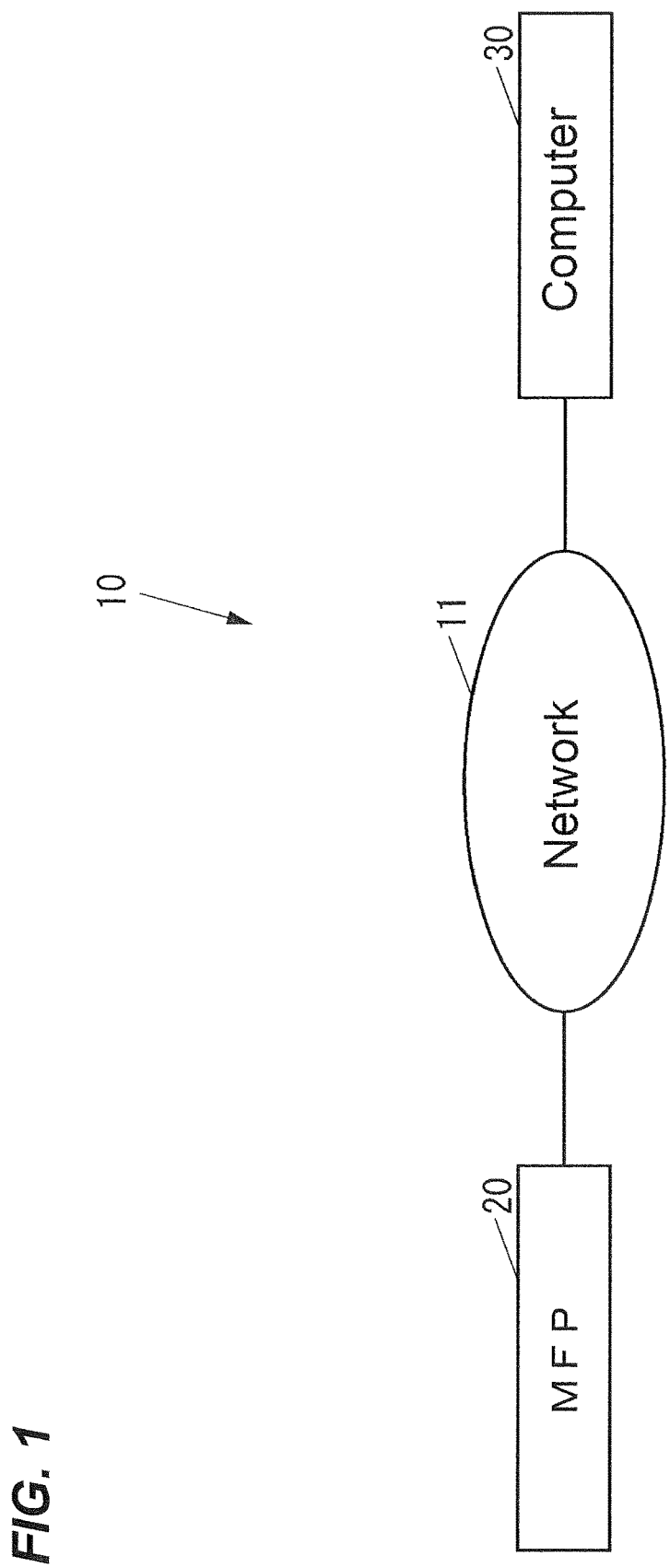
FIG. 1 illustrates a block diagram illustrating a function execution system according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

First Embodiment

The following describes a first embodiment of the disclosure by referring to the drawings.

First, a description will be given of a configuration of a function execution system that includes a Multifunction Peripheral (MFP) as an electronic device according to the embodiment.

FIG. 1 illustrates a block diagram illustrating a function execution system 10 according to the embodiment.

As illustrated in FIG. 1, the function execution system 10 includes an MFP 20 and a computer 30 such as a Personal Computer (PC) communicable with the MFP 20 via a network 11 such as a Local Area Network (LAN) or the Internet.

The function execution system 10 may include equal to or more than one MFP, which is similar to the MFP 20, other than the MFP 20. The function execution system 10 may include equal to or more than one computer, which is similar to the computer 30, other than the computer 30.

Figure 2:
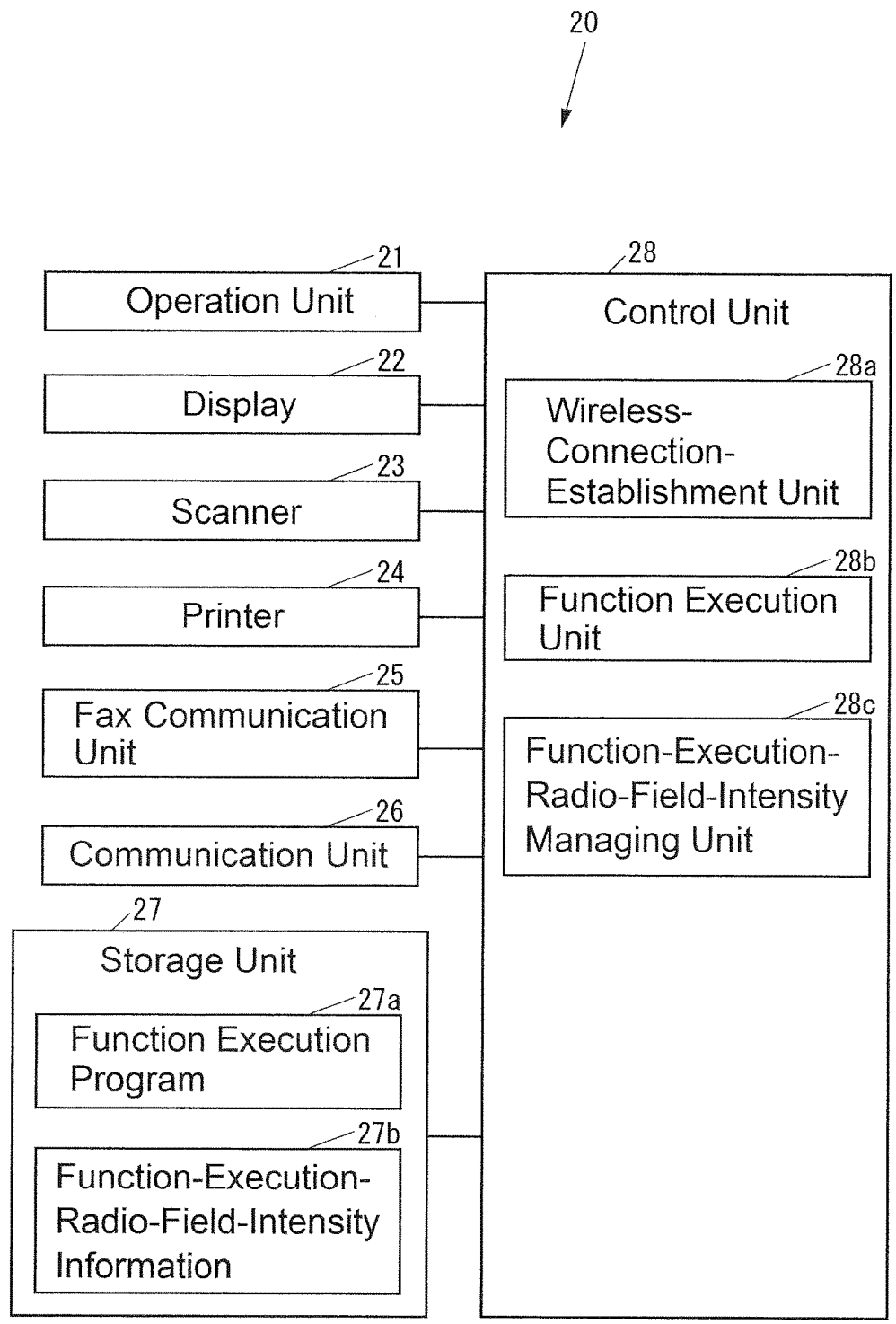
FIG. 2 illustrates a block diagram illustrating an MFP according to the first embodiment.

FIG. 2 illustrates a block diagram illustrating the MFP 20.

As illustrated in FIG. 2, the MFP 20 includes: an operation unit 21 that is an input device such as a button with which various kinds of operations are entered; a display 22 that is a display device such as a Liquid Crystal Display (LCD) that displays various kinds of information; a scanner 23 that is a reading device that reads an image from a document; a printer 24 that is a print device that prints an image to a printable medium such as a paper sheet; a fax communication unit 25 that is a fax device that performs fax communication with an external facsimile device (not illustrated) via a communication line such as a dial-up line; a communication unit 26 that is a communication device that communicates with an external device directly via wired or wireless connection without via the network 11 (see FIG. 1), or via the network 11; a storage unit 27 that is a non-volatile storage device such as a semiconductor memory or a Hard Disk Drive (HDD) that stores various kinds of information; and a control unit 28 that controls the whole MFP 20.

The storage unit 27 stores a function execution program 27a for executing the functions of the MFP 20. The function execution program 27a may be installed into the MFP 20 at production stage of the MFP 20, may be additionally installed into the MFP 20 from an external storage medium such as an SD card or a Universal Serial Bus (USB) memory, or may be additionally installed into the MFP 20 from the network 11.

The storage unit 27, as a radio field intensity of a directly communicable wireless connection established with other devices, stores function-execution-radio-field-intensity information 27b that indicates a specified radio field intensity for executing a function requested from the other devices via the wireless connection, for each function.

Here, as a directly communicable wireless connection with the other devices, namely, as a P2P connection in the wireless connection, for example, there is known a connection (hereinafter referred to as "Wi-Fi Direct connection") by Wi-Fi Direct (registered trademark) of Wi-Fi Alliance. While the following describes the Wi-Fi Direct connection as the directly communicable wireless connection with the other devices, another wireless connection may be employed.

Figure 3:
FIG. 3 illustrates an example of function-execution-radio-field-intensity information illustrated in FIG. 2.

FIG. 3 illustrates an example of the function-execution-radio-field-intensity information 27b.

In the function-execution-radio-field-intensity information 27b illustrated in FIG. 3, the radio field intensity is specified in three phases of "weak intensity," "medium intensity," and "strong intensity." In practice, ranges of the "weak intensity," "medium intensity," and "strong intensity" are each specified, for example, by specific numerical values in dbm unit that indicate the radio field intensity. The radio field intensity in the function-execution-radio-field-intensity information 27b may be specified by equal to or more than four phases.

The function-execution-radio-field-intensity information 27b targets only the function where whether to execute or not changes based on the radio field intensity. For example, in the function-execution-radio-field-intensity information 27b illustrated in FIG. 3, while a function where execution is permitted is set as "none" when the radio field intensity is "weak intensity," a function where whether to execute or not does not change based on the radio field intensity is executed even when the radio field intensity is "weak intensity."

As the function where whether to execute or not changes based on the radio field intensity, for example, the function that is likely to cause the MFP 20 to be in an unusable state can be employed. As the function that is likely to cause the MFP 20 to be in an unusable state, for example, the following functions can be employed: a "setting change" function where various kinds of settings in the MFP 20 are changed; a "print" function that executes printing to a printable medium by the printer 24; a "firmware update" function that updates the firmware of the MFP 20; a "network reboot" function that reboots a network connection by the MFP 20; and a "device reboot" function that reboots the MFP 20.

The "setting change" function can, for example, perform: changing login information; changing whether Internet Protocol (IP) address is assigned or not; changing whether execution of printing is permitted or not; and changing whether use of each of print protocols such as Internet Printing Protocol (IPP) is permitted or not. The MFP 20 is likely to become in the unusable state for a user depending on contents of a setting that is changed by the "setting change" function.

When printing is executed based on a large amount of print data by the "print" function, the MFP 20 is likely to become in the unusable state for a person other than the user that has requested execution of the "print" function because the control unit 28 is dedicated to processing of the large amount of print data.

When an inappropriate firmware is updated by the "firmware update" function, the MFP 20 is likely to become in the unusable state for a user.

When the "network reboot" function is continuously executed, the MFP 20 is likely to become in the unusable state for a person other than the user that has requested the execution of the "network reboot" function because the control unit 28 is dedicated to the execution of the "network reboot" function.

When the "device reboot" function is continuously executed, the MFP 20 is likely to become in the unusable state for a person other than the user that has requested the execution of the "device reboot" function because the control unit 28 is dedicated to the execution of the "device reboot" function.

As the function that is not likely to cause the MFP 20 to be in the unusable state, for example, a "setting reference" function where various kinds of settings in the MFP 20 are referenced can be employed.

The setting that is changed by the "setting change" function includes a setting that is not likely to cause the MFP 20 to be in the unusable state. The setting that is changed by the "setting change" function can be returned to an original setting via the operation unit 21 of the MFP 20. Consequently, in the function-execution-radio-field-intensity information 27b illustrated in FIG. 3, among the functions where whether to execute or not changes based on the radio field intensity, the execution of only the "setting change" function is permitted at equal to or more than the "medium intensity" of the radio field intensity, and among the functions where whether to execute or not changes based on the radio field intensity, the execution of the functions other than the "setting change" function is permitted at equal to or more than the "strong intensity" of the radio field intensity. That is, in the function-execution-radio-field-intensity information 27b illustrated in FIG. 3, among the functions where whether to execute or not changes based on the radio field intensity, the execution of the "setting change" function is likely to be permitted compared with the functions other than the "setting change" function.

As described above, among the functions that is likely to cause the MFP 20 to be in the unusable state, the "setting change" function is less likely to cause the MFP 20 to be in the unusable state compared with the other functions. In such a case, among the functions that is likely to cause the MFP 20 to be in the unusable state, the function-execution-radio-field-intensity information 27b may indicate that the function that is relatively more likely to cause the MFP 20 to be in the unusable state is set to be a target where the execution of the function is permitted at strong radio field intensity, compared with the function that is relatively less likely to cause the MFP 20 to be in the unusable state. That is, the function-execution-radio-field-intensity information 27b may indicate that the MFP 20 executes the function that is less likely to cause the MFP 20 to be in the unusable state, compared with the function that is more likely to cause the MFP 20 to be in the unusable state, even when the radio field intensity of the Wi-Fi Direct connection established with the computer 30 is low.

The control unit 28 illustrated in FIG. 2 includes, for example, a Central Processing Unit (CPU), a Read Only Memory (ROM) that stores programs and various kinds of data, and a Random Access Memory (RAM) that is used as a work area for the CPU. The CPU executes the programs stored in the ROM or the storage unit 27.

By executing the function execution program 27a stored in the storage unit 27, the control unit 28 achieves a wireless-connection-establishment unit 28a that establishes the Wi-Fi Direct connection with the other devices, a function execution unit 28b that executes the functions, and a function-execution-radio-field-intensity managing unit 28c that manages the function-execution-radio-field-intensity information 27b.

Figure 4:
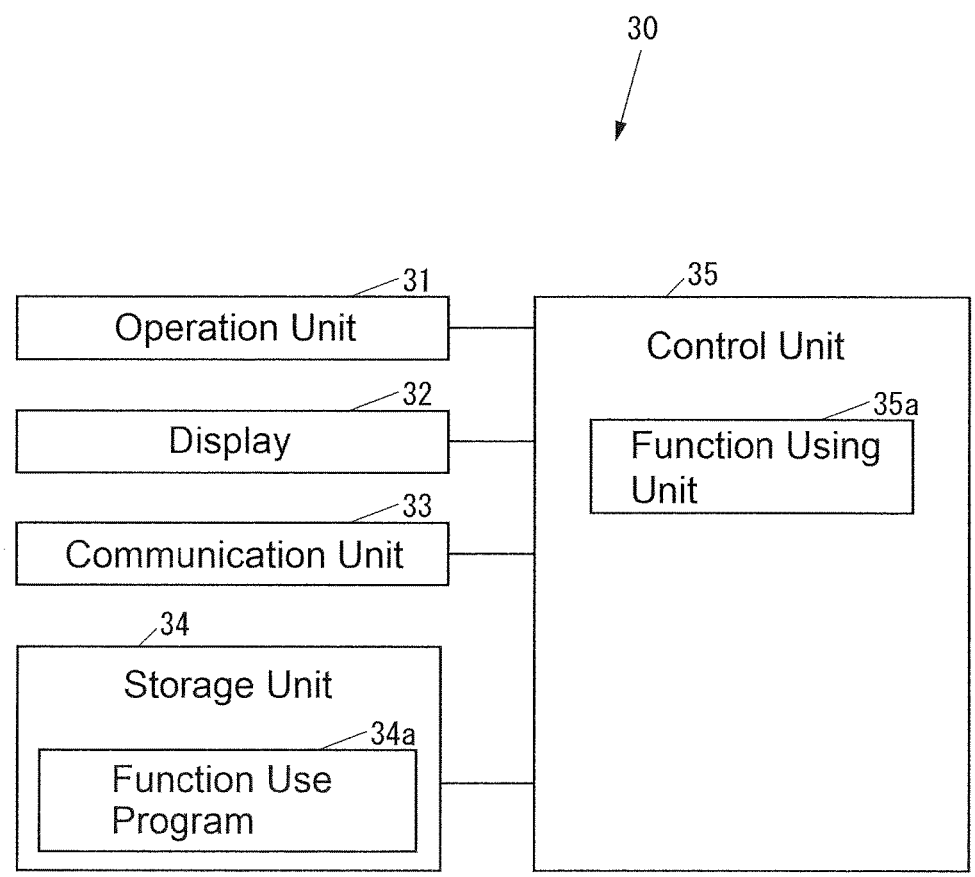
FIG. 4 illustrates a block diagram illustrating a computer according to the first embodiment.

FIG. 4 illustrates a block diagram illustrating the computer 30.

As illustrated in FIG. 4, the computer 30 includes: an operation unit 31 that is an input device such as a computer mouse or a keyboard with which various kinds of operations are entered; a display 32 that is a display device such as an LCD that displays various kinds of information; a communication unit 33 that is a communication device that communicates with an external device directly via wired or wireless connection without via the network 11 (see FIG. 1), or via the network 11; a storage unit 34 that is a non-volatile storage device such as a semiconductor memory or HDD that stores various kinds of information; and a control unit 35 that controls the whole computer 30.

The storage unit 34 stores a function use program 34a for using the functions of the MFP 20 (see FIG. 1). The function use program 34a may be installed into the computer 30 at production stage of the computer 30, may be additionally installed into the computer 30 from an external storage medium such as a USB memory, a Compact Disc (CD) or a Digital Versatile Disc (DVD), or may be additionally installed into the computer 30 from the network 11.

The control unit 35 includes, for example, a CPU, a ROM that stores programs and various kinds of data, and a RAM that is used as a work area for the CPU. The CPU executes the programs stored in the ROM or the storage unit 34.

By executing the function use program 34a, the control unit 35 ensures a function using unit 35a that uses the functions of the MFP 20.

Next, a description will be given of the operations of the function execution system 10.

First, a description will be given of the operations of the MFP 20 when the function-execution-radio-field-intensity information 27b is updated.

The function-execution-radio-field-intensity managing unit 28c updates the function-execution-radio-field-intensity information 27b in response to an instruction from the operation unit 21.

Next, a description will be given of the operations of the MFP 20 and the computer 30 when establishing the Wi-Fi Direct connection.

Figure 5:
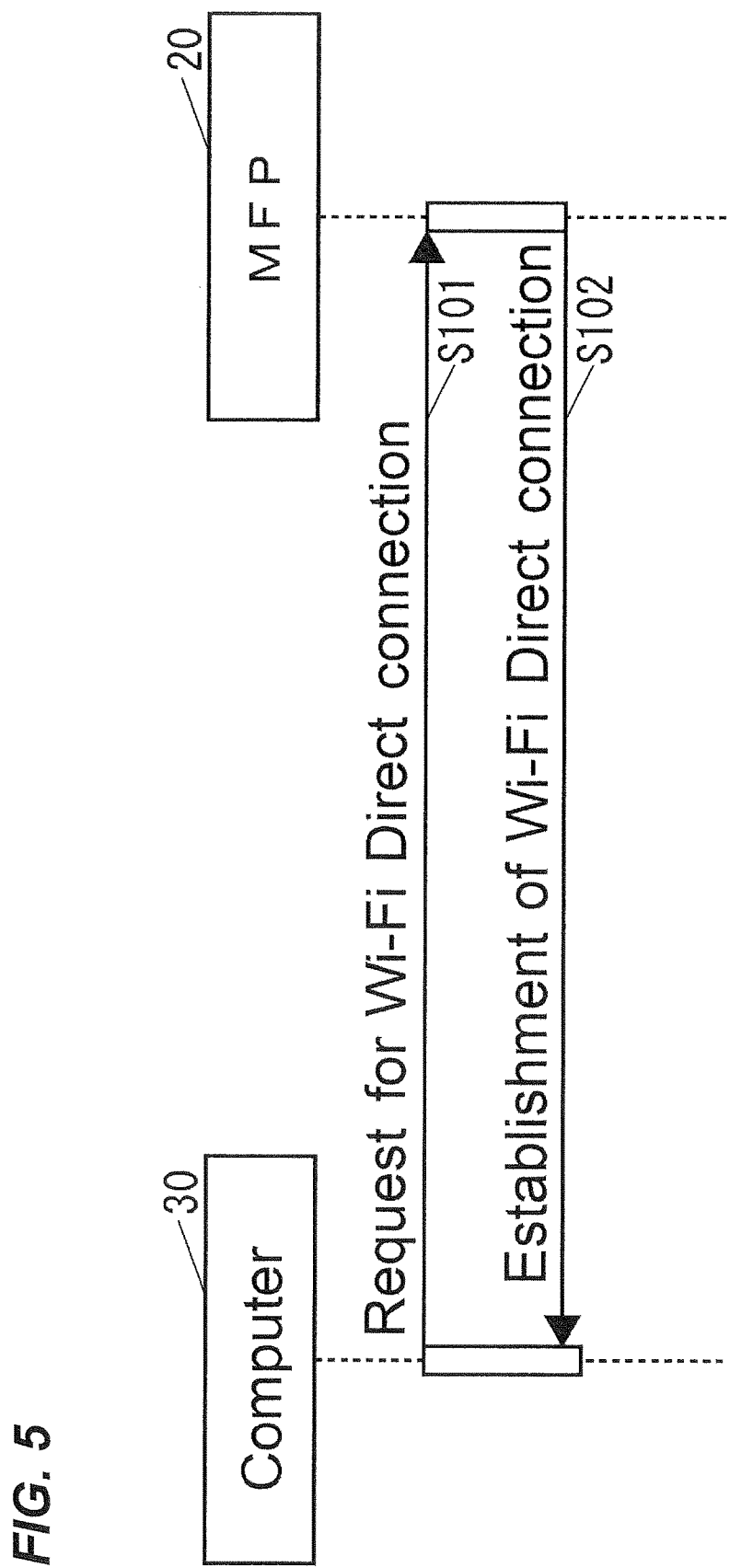
FIG. 5 illustrates operations of the MFP and computer according to the first embodiment when a Wi-Fi Direct connection is established.

FIG. 5 illustrates the operations of the MFP 20 and the computer 30 when establishing the Wi-Fi Direct connection.

As illustrated in FIG. 5, the control unit 35 of the computer 30 requests the Wi-Fi Direct connection to the MFP 20 (Step S101).

Accordingly, the wireless-connection-establishment unit 28a of the MFP 20 establishes the Wi-Fi Direct connection with the computer 30 (Step S102).

Next, a description will be given of the operations of the MFP 20 when execution of a function is requested from the computer 30 via the Wi-Fi Direct connection.

Figure 6:
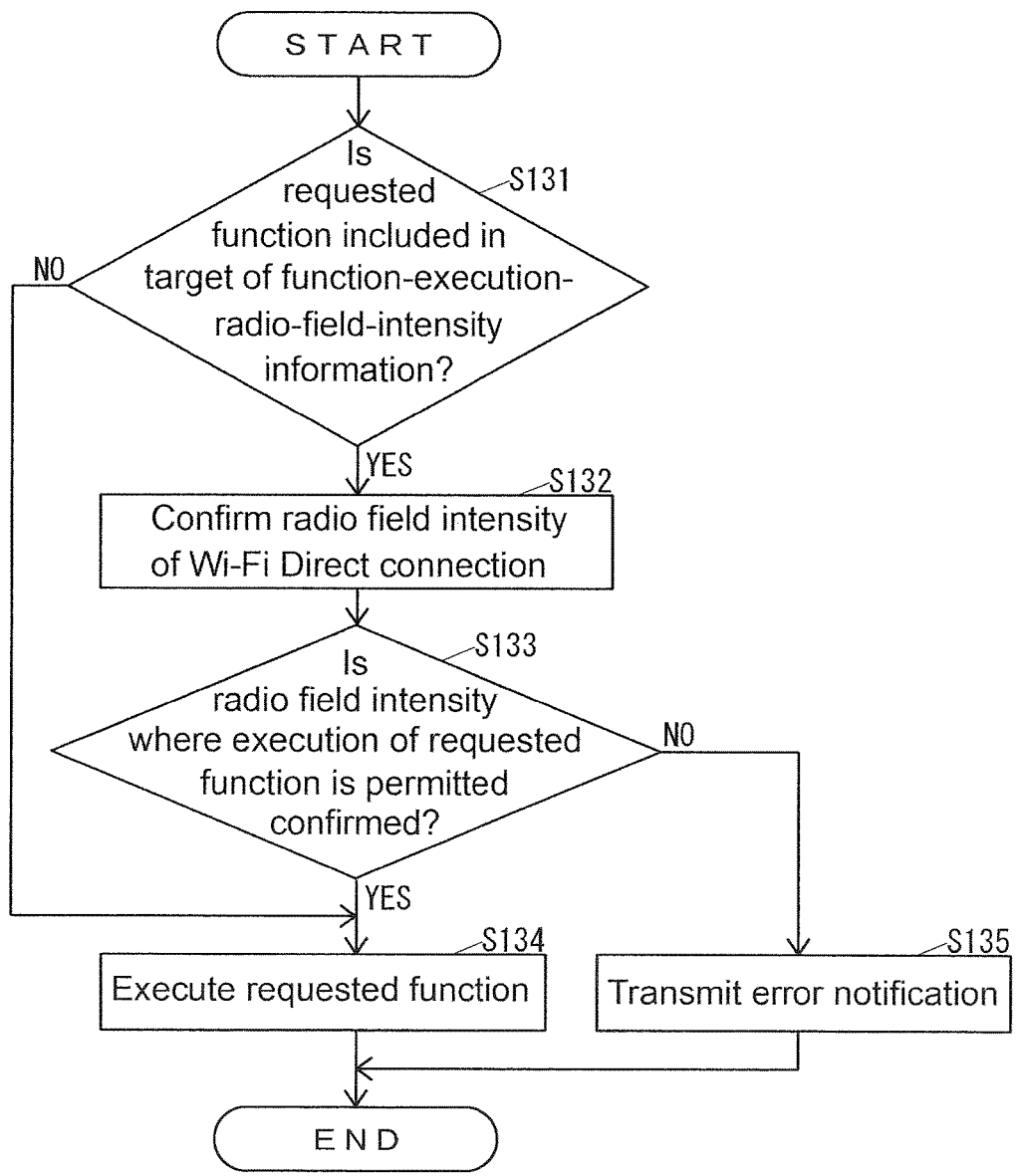
FIG. 6 illustrates the operations of the MFP according to the first embodiment when execution of a function is requested from the computer via the Wi-Fi Direct connection.

FIG. 6 illustrates the operations of the MFP 20 when execution of a function is requested from the computer 30 via the Wi-Fi Direct connection.

When execution of a function is requested from the function using unit 35a of the computer 30 via the Wi-Fi Direct connection, the control unit 28 of the MFP 20 executes the operations illustrated in FIG. 6.

As illustrated in FIG. 6, the function-execution-radio-field-intensity managing unit 28c determines whether the function (hereinafter referred to as "requested function") requested from the computer 30 via the Wi-Fi Direct connection is included in the target of the function-execution-radio-field-intensity information 27b or not (Step S131).

When determining that the requested function is included in the target of the function-execution-radio-field-intensity information 27b at Step S131, the function-execution-radio-field-intensity managing unit 28c confirms the radio field intensity of the Wi-Fi Direct connection established with the computer 30 (Step S132).

Next, the function-execution-radio-field-intensity managing unit 28c determines whether the radio field intensity confirmed at Step S132 is set as the radio field intensity where the execution is permitted with respect to the requested function in the function-execution-radio-field-intensity information 27b or not (Step S133).

When it is determined that the requested function is not included in the target of the function-execution-radio-field-intensity information 27b at S131, the function execution unit 28b executes the requested function (Step S134) and terminates the operations illustrated in FIG. 6. For example, when the requested function is a function other than the functions where whether to execute or not changes based on the radio field intensity, the function execution unit 28b executes the requested function.

When it is determined that the radio field intensity confirmed at Step S132 is set as the radio field intensity where the execution is permitted with respect to the requested function in the function-execution-radio-field-intensity information 27b at Step S133, the function execution unit 28b executes the requested function (Step S134) and terminates the operations illustrated in FIG. 6. For example, when the requested function is the "setting change" function, the function execution unit 28b executes the requested function when the radio field intensity confirmed at Step S132 is equal to or more than the "medium intensity." When the requested function is a function other than the "setting change" function among the functions where whether to execute or not changes based on the radio field intensity, the function execution unit 28b executes the requested function when the radio field intensity confirmed at Step S132 is equal to or more than the "strong intensity."

When it is determined that the radio field intensity confirmed at Step S132 is not set as the radio field intensity where the execution is permitted with respect to the requested function in the function-execution-radio-field-intensity information 27b at Step S133, the function execution unit 28b transmits an error notification that indicates rejection of the execution of the requested function to the computer 30 via the Wi-Fi Direct connection (Step S135) and terminates the operations illustrated in FIG. 6. In other words, the function execution unit 28b rejects the execution of the requested function requested from the computer 30 via the Wi-Fi Direct connection at Step S135. For example, when the requested function is the "setting change" function, the function execution unit 28b transmits an error notification to the computer 30 when the radio field intensity confirmed at Step S132 is less than the "medium intensity." When the requested function is a function other than the "setting change" function among the functions where whether to execute or not changes based on the radio field intensity, the function execution unit 28b transmits an error notification to the computer 30 when the radio field intensity confirmed at Step S132 is less than the "strong intensity."

When receiving an error notification from the MFP 20, the function using unit 35a of the computer 30 displays the received error notification on the display 32.

As described above, the MFP 20 executes the function that is requested from the computer 30 via the Wi-Fi Direct connection as the directly communicable wireless connection established with the computer 30, namely, the requested function (Step S134) when the radio field intensity of the Wi-Fi Direct connection is equal to or more than a specified radio field intensity (YES at Step S133) and does not execute when the radio field intensity is less than the specified radio field intensity (NO at Step S133). Thus, the MFP 20 is likely not to execute the function requested from the computer 30 that is likely not to be permitted to request a function to the MFP 20 itself via the Wi-Fi Direct connection established with the MFP 20 itself, such as the computer 30 that is located at a distant position from the position of the MFP 20 itself or the computer 30 where an obstacle of radio wave, such as a wall, is located between the MFP 20 itself and the computer 30. That is, the MFP 20 executes all the requested functions without specific limitation when the radio field intensity of the Wi-Fi Direct connection established with the computer 30 is strong and limits the executable functions when the radio field intensity of the Wi-Fi Direct connection established with the computer 30 is weak. Consequently, the MFP 20 ensures improvement of security performance.

For example, even when there is unauthorized access by the computer 30 that is located outside the building where the MFP 20 is located via the Wi-Fi Direct connection, the MFP 20 limits the executable functions because the radio field intensity of the Wi-Fi Direct connection is weak. Consequently, the MFP 20 ensures reducing damage caused by unauthorized access to a minimum.

There are a plurality of kinds of specified radio field intensities that become a reference of permitting execution of the functions as follows: a minimum value of the "medium intensities" of the radio field intensity; and a minimum value of the "strong intensities" of the radio field intensity, and the minimum value of the "medium intensities" of the radio field intensity and the minimum value of the "strong intensities" of the radio field intensity are each associated with different functions. Thus, the MFP 20 determines a degree of security for each function. Consequently, the MFP 20 ensures improvement of convenience.

As described above, when determining whether to execute the function that is likely to cause the MFP 20 to be in the unusable state or not based on the radio field intensity of the Wi-Fi Direct connection established with the computer 30 and executing the function without possibility of causing the MFP 20 to be in the unusable state regardless of the radio field intensity of the Wi-Fi Direct connection established with the computer 30, the MFP 20 ensures the improved convenience.

As described above, when executing the function that is less likely to cause the MFP 20 to be in the unusable state even when the radio field intensity of the Wi-Fi Direct connection established with the computer 30 is weak, compared with the function that is likely to cause the MFP 20 to be in the unusable, the MFP 20 ensures improvement of convenience.

Second Embodiment

Figure 7:
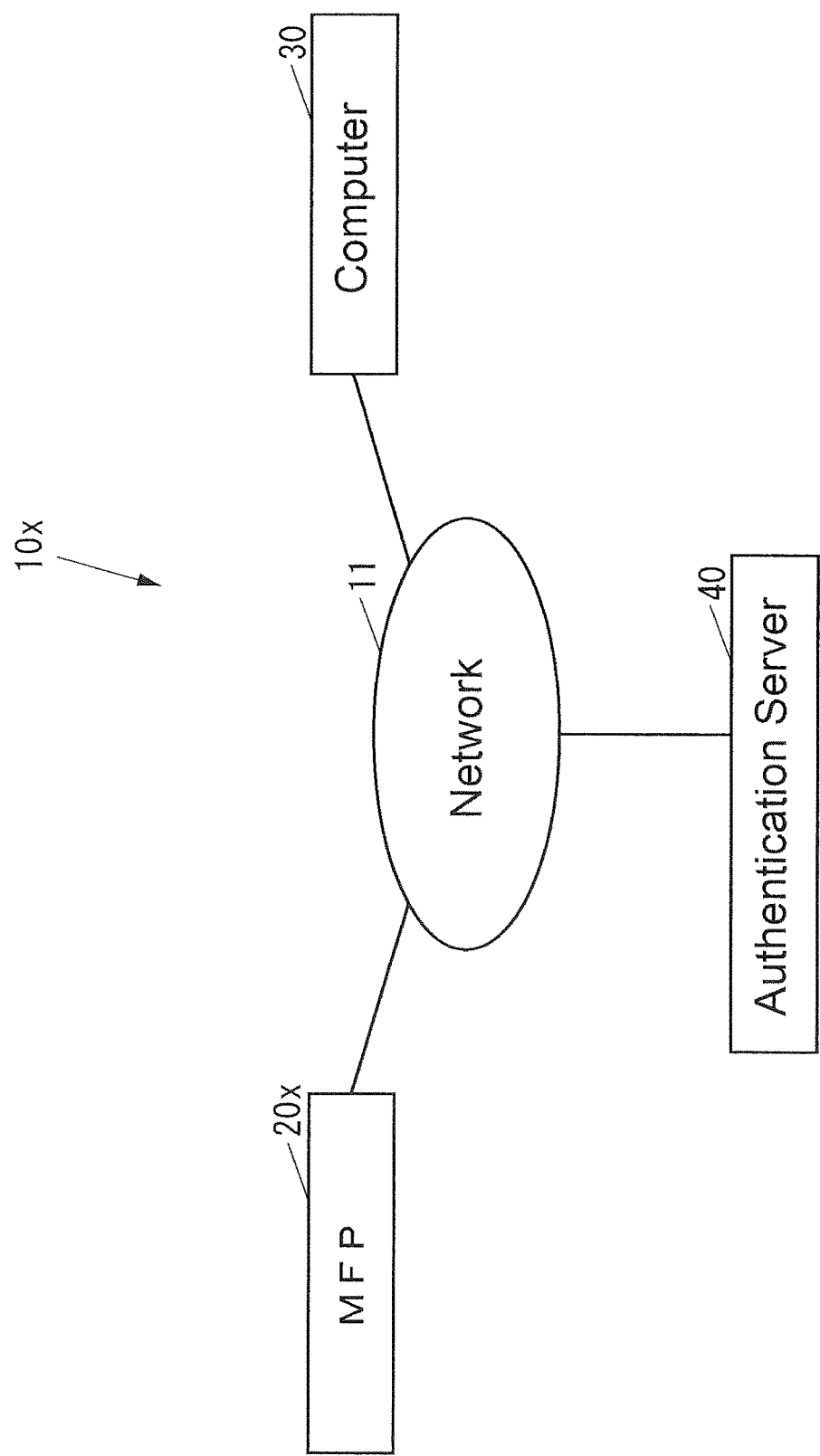
FIG. 7 illustrates a block diagram illustrating a function execution system according to a second embodiment of the disclosure.

FIG. 7 illustrates a block diagram illustrating a function execution system 10x according to a second embodiment.

As illustrated in FIG. 7, the function execution system 10x is different from the function execution system 10 according to the first embodiment in that an authentication server 40 communicable with an MFP 20x via the network 11 is included.

Figure 8:
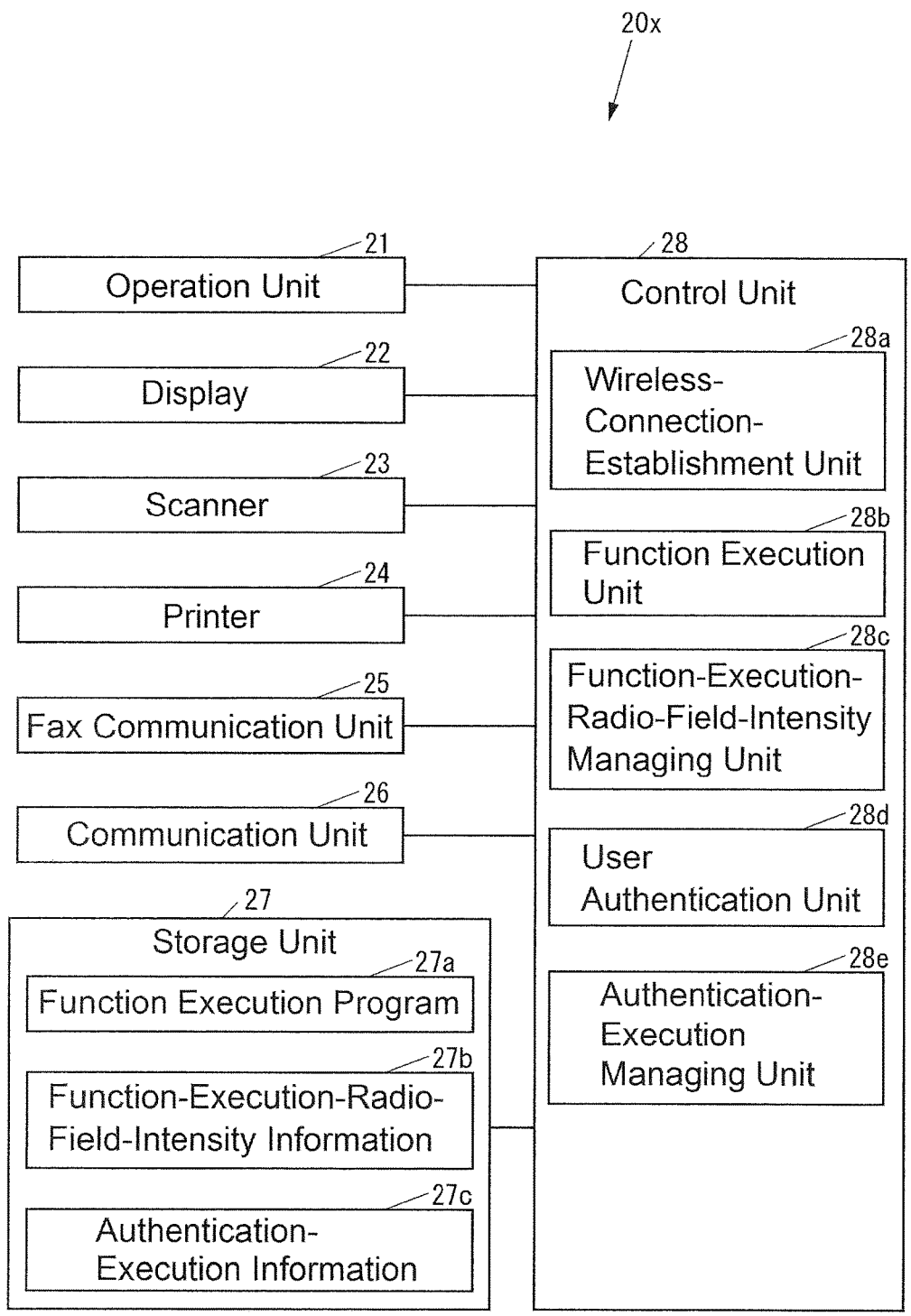
FIG. 8 illustrates a block diagram illustrating an MFP according to the second embodiment.

FIG. 3 illustrates an example of function-execution-radio-field-intensity information illustrated in FIG. 2. The MFP 20x is different from the MFP 20 according to the first embodiment in that authentication-execution information 27c, a user authentication unit 28d, an authentication-execution managing unit 28e are included. As illustrated in FIG. 8, a storage unit 27 stores the authentication-execution information 27c that indicates whether to execute authentication of users of the other devices or not for each function when the radio field intensity of the Wi-Fi Direct connection established with the other devices is outside a specified range.

Figure 9:
FIG. 9 illustrates an example of authentication-execution information illustrated in FIG. 8.

FIG. 9 illustrates an example of the authentication-execution information 27c.

The authentication-execution information 27c illustrated in FIG. 9 targets only the function targeted in the function-execution-radio-field-intensity information 27b. For example, in the authentication-execution information 27c illustrated in FIG. 9, the "network reboot" function and the "device reboot" function does not execute authentication of users of the other devices when the radio field intensity of the Wi-Fi Direct connection established with the other devices is outside the specified range, and the function that is neither the "network reboot" function nor the "device reboot" function executes authentication of users of the other devices when the radio field intensity of the Wi-Fi Direct connection established with the other devices is outside the specified range.

By executing a function execution program 27a stored in the storage unit 27, a control unit 28 illustrated in FIG. 8 ensures: the wireless-connection-establishment unit 28a that establishes the Wi-Fi Direct connection with the other devices; the function execution unit 28b that executes the functions; the function-execution-radio-field-intensity managing unit 28c that manages the function-execution-radio-field-intensity information 27b; the user authentication unit 28d that executes authentication of a user; the authentication-execution managing unit 28e that manages whether to execute authentication of users of the other devices or not for each function when the radio field intensity of the Wi-Fi Direct connection established with the other devices is outside the specified range.

Figure 10:
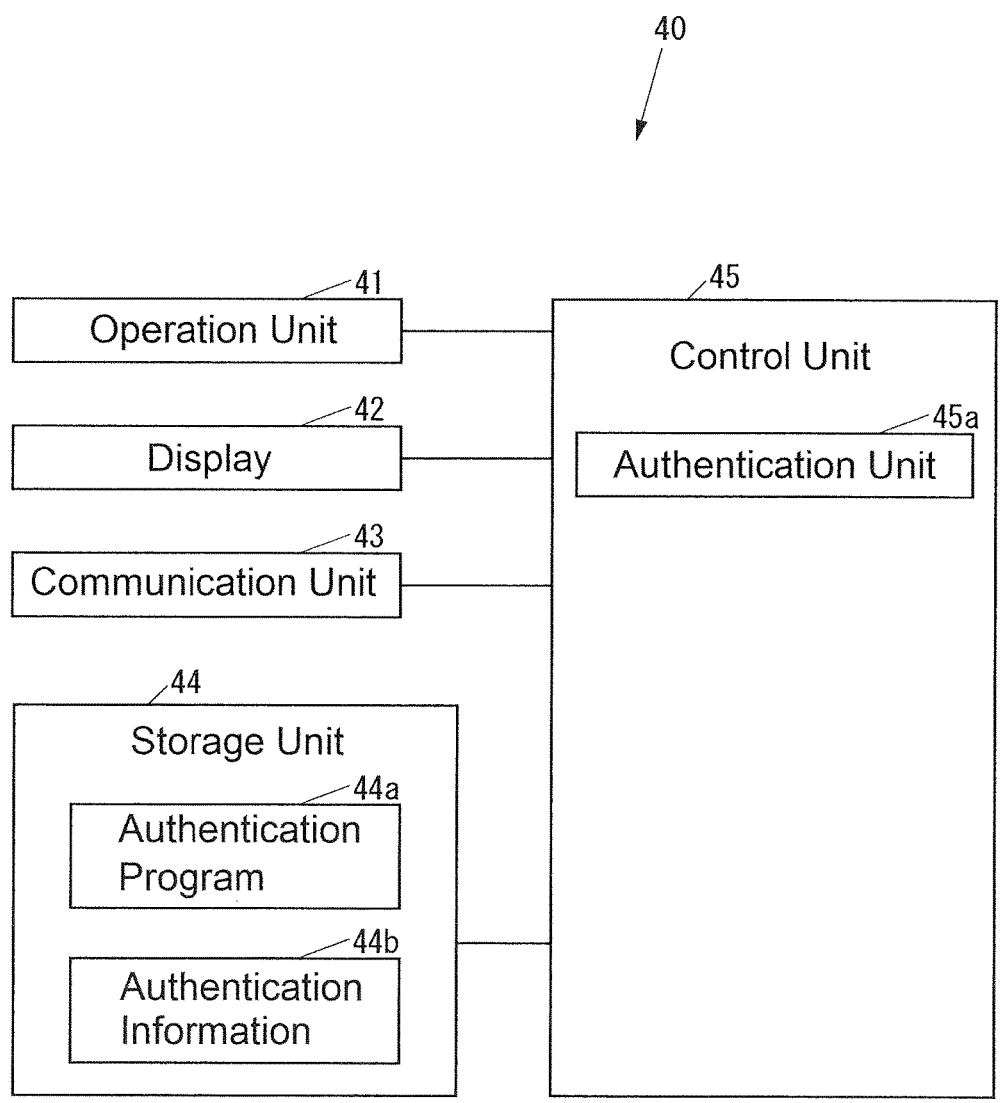
FIG. 10 illustrates a block diagram illustrating an authentication server according to the second embodiment.

FIG. 10 illustrates a block diagram illustrating the authentication server 40.

As illustrated in FIG. 10, the authentication server 40 includes: an operation unit 41 that is an input device such as a computer mouse or a keyboard with which various kinds of operations are entered; a display 42 that is a display device such as an LCD that displays various kinds of information; a communication unit 43 that is a communication device that communicates with an external device directly via wired or wireless connection without via the network 11 (see FIG. 7), or via the network 11; a storage unit 44 that is a non-volatile storage device such as a semiconductor memory or an HDD that stores various kinds of information; and a control unit 45 that controls the whole authentication server 40.

The storage unit 44 stores an authentication program 44a for authenticating a user. The authentication program 44a may be installed into the authentication server 40 at production stage of the authentication server 40, may be additionally installed into the authentication server 40 from an external storage medium such as a USB memory, a CD, or a DVD, or may be additionally installed into the authentication server 40 from the network 11.

The storage unit 44 stores authentication information 44b used for authentication of a user. For example, the authentication information 44b is combined information of an ID and password of a user.

The control unit 45 includes, for example, a CPU, a ROM that stores programs and various kinds of data, and a RAM that is used for a work area of the CPU. The CPU executes the programs stored in the ROM or the storage unit 44.

By executing the authentication program 44a, the control unit 45 ensures an authentication unit 45a that executes authentication of a user.

Next, a description will be given of operations of the function execution system 10x.

First, a description will be given of operations of the MFP 20x when the function-execution-radio-field-intensity information 27b is updated.

The function-execution-radio-field-intensity managing unit 28c updates the function-execution-radio-field-intensity information 27b in response to an instruction from the operation unit 21.

Next, a description will be given of the operations of the MFP 20x when the authentication-execution information 27c is updated.

The authentication-execution managing unit 28e updates the authentication-execution information 27c in response to the instruction from the operation unit 21.

The operations of the MFP 20x and the computer 30 when establishing the Wi-Fi Direct connection is similar to the first embodiment.

Next, a description will be given of the operations of the MFP 20x according to the second embodiment when execution of a function is requested from the computer 30 via the Wi-Fi Direct connection.

Figure 11:
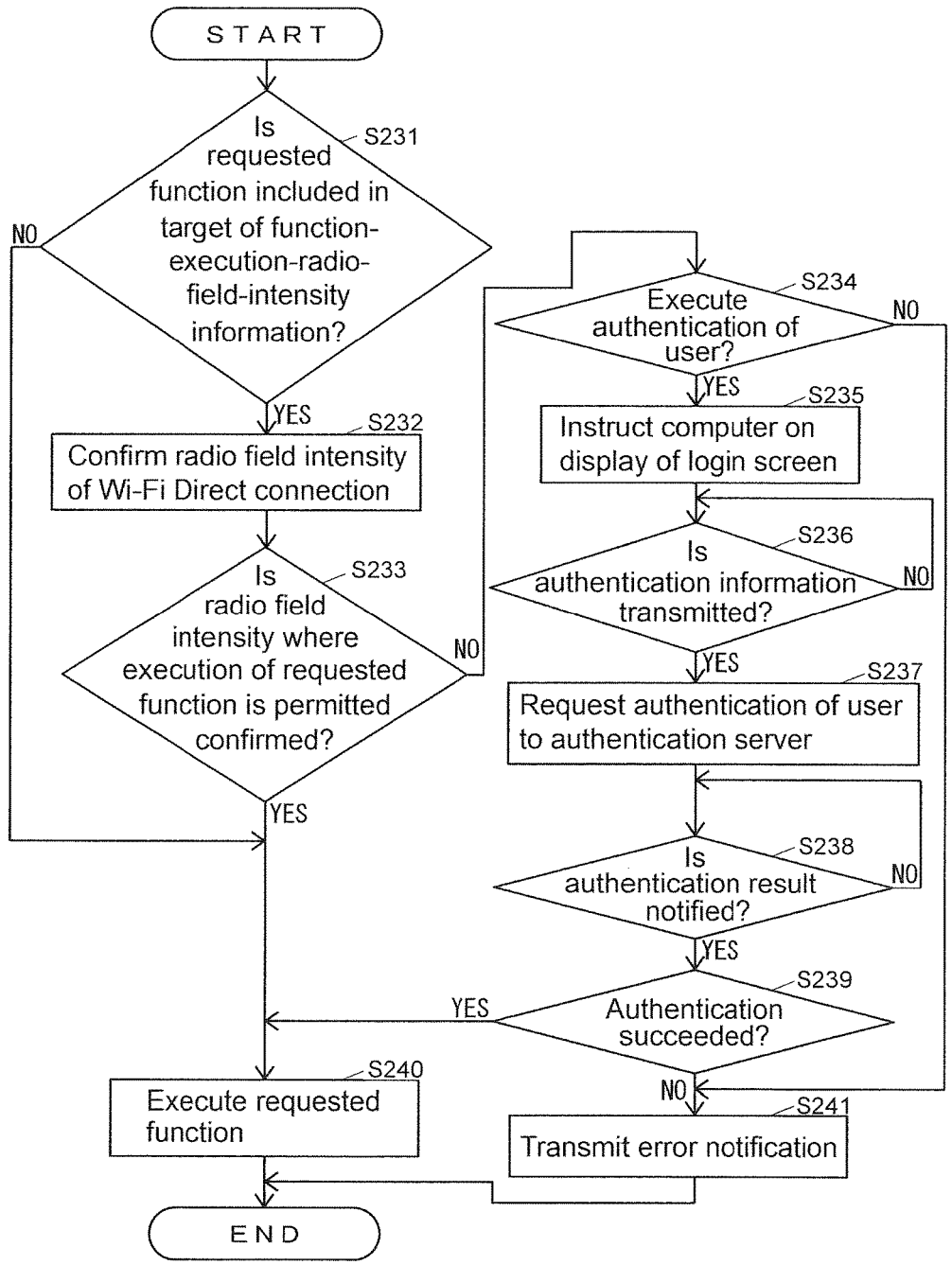
FIG. 11 illustrates the operations of the MFP according to the second embodiment when execution of a function is requested from the computer via the Wi-Fi Direct connection.

FIG. 11 illustrates the operations of the MFP 20x when execution of a function is requested from the computer 30 via the Wi-Fi Direct connection.

When execution of a function is requested from the function using unit 35a of the computer 30 via the Wi-Fi Direct connection, the control unit 28 of the MFP 20x executes the operations illustrated in FIG. 11.

As illustrated in FIG. 11, the function-execution-radio-field-intensity managing unit 28c determines whether the function (hereinafter referred to as "requested function") requested from the computer 30 via the Wi-Fi Direct connection is included in the target of the function-execution-radio-field-intensity information 27b or not (Step S231).

When determining that the requested function is included in the target of the function-execution-radio-field-intensity information 27b at Step S231, the function-execution-radio-field-intensity managing unit 28c confirms the radio field intensity of the Wi-Fi Direct connection established with the computer 30 (Step S232).

Next, the function-execution-radio-field-intensity managing unit 28c determines whether the radio field intensity, which has been confirmed at Step S232, is set as the radio field intensity where execution is permitted with respect to the requested function in the function-execution-radio-field-intensity information 27b or not (Step S233).

When it is determined that the radio field intensity, which has been confirmed at Step S232, is not set as the radio field intensity where execution is permitted with respect to the requested function in the function-execution-radio-field-intensity information 27b at Step S233, the authentication-execution managing unit 28e determines whether to execute authentication of users of the other devices or not in the case of the requested function, based on the authentication-execution information 27c (Step S234).

When it is determined that authentication of users of the other devices will be executed in the case of the requested function at Step S234, the user authentication unit 28d transmits an instruction to display a login screen to the computer 30 (Step S235). Accordingly, the function using unit 35a of the computer 30 displays the login screen on the display 32 in response to the instruction transmitted from the MFP 20x. Then, when authentication information of the user is entered in the login screen displayed on the display 32 via the operation unit 31, the function using unit 35a transmits the entered authentication information to the MFP 20x.

After the process at Step S235, the user authentication unit 28d determines whether authentication information is transmitted from the computer 30 or not until determining that authentication information is transmitted from the computer 30 (Step S236).

When determining that authentication information is transmitted from the computer 30 at Step S236, the user authentication unit 28d requests authentication of the user to the authentication server 40 by transmitting the authentication information transmitted from the computer 30 to the authentication server 40 (Step S237). Subsequently, the authentication unit 45a of the authentication server 40 notifies the MFP 20x that authentication of the user has succeeded when the authentication information transmitted from the MFP 20x is included in the authentication information 44b and notifies the MFP 20x that authentication of the user has failed when the authentication information transmitted from the MFP 20x is not included in the authentication information 44b.

After the process at Step S237, the user authentication unit 28d determines whether an authentication result is notified from the authentication server 40 or not until determining that the authentication result is notified from the authentication server 40 (Step S238).

When determining that the authentication result has been notified from the authentication server 40 at Step S238, the user authentication unit 28d determines whether the authentication of the user has succeeded or not based on the authentication result notified from the authentication server 40 (Step S239).

When it is determined that the requested function is not included in the target of the function-execution-radio-field-intensity information 27b at Step S231, the function execution unit 28b executes the requested function (Step S240) and terminates the operations illustrated in FIG. 11. For example, when the requested function is a function other than the functions where whether to execute or not changes based on the radio field intensity, the function execution unit 28b executes the requested function.

When it is determined that the radio field intensity, which is confirmed at Step S232, is set as the radio field intensity where execution is permitted with respect to the requested function in the function-execution-radio-field-intensity information 27b at Step S233, the function execution unit 28b executes the requested function (Step S240) and terminates the operations illustrated in FIG. 11. For example, when the requested function is the "setting change" function, the function execution unit 28b executes the requested function when the radio field intensity, which has been confirmed at Step S232, is equal to or more than the "medium intensity." When the requested function is a function other than the "setting change" function among the functions where whether to execute or not changes based on the radio field intensity, the function execution unit 28b executes the requested function when the radio field intensity, which has been confirmed at Step S232, is equal to or more than the "strong intensity."

When it is determined that the authentication of the user has succeeded at Step S239, the function execution unit 28b executes the requested function (Step S240) and terminates the operations illustrated in FIG. 11. For example, when the requested function is the "setting change" function, and the radio field intensity, which has been confirmed at Step S232, is less than the "medium intensity," the function execution unit 28b executes the requested function when the authentication of the user has succeeded. When the requested function is a function other than the "setting change" function, the "network reboot" function, and the "device reboot" function among the functions where whether to execute or not changes based on the radio field intensity, and the radio field intensity, which has been confirmed at Step S232, is less than the "strong intensity," the function execution unit 28b executes the requested function when the authentication of the user has succeeded.

When it is determined that the authentication of the user of the other device will not be executed in the case of the requested function at Step S234, the function execution unit 28b transmits an error notification that indicates rejection of the execution of the requested function to the computer 30 via the Wi-Fi Direct connection (Step S241) and terminates the operations illustrated in FIG. 11. In other words, the function execution unit 28b rejects the execution of the requested function requested from the computer 30 via the Wi-Fi Direct connection at Step S241. For example, when the requested function is any one of the "network reboot" function and the "device reboot" function, the function execution unit 28b transmits an error notification to the computer 30 when the radio field intensity, which has been confirmed at Step S232, is less than the "strong intensity."

When it is determined that the authentication of the user has failed at Step S239, the function execution unit 28b transmits an error notification that indicates rejection of the execution of the requested function to the computer 30 via the Wi-Fi Direct connection (Step S241) and terminates the operations illustrated in FIG. 11. In other words, the function execution unit 28b rejects the execution of the requested function requested from the computer 30 via the Wi-Fi Direct connection at Step S241. For example, when the requested function is the "setting change" function, and the radio field intensity, which has been confirmed at Step S232, is less than the "medium intensity," the function execution unit 28b transmits an error notification to the computer 30 when the authentication of the user has failed. When the requested function is a function other than the "setting change" function, the "network reboot" function, and the "device reboot" function among the functions where whether to execute or not changes based on the radio field intensity, and the radio field intensity, which has been confirmed at Step S232, is less than the "strong intensity," the function execution unit 28b transmits an error notification to the computer 30 when the authentication of the user has failed.

When receiving an error notification from the MFP 20x, the function using unit 35a of the computer 30 displays the received error notification on the display 32.

As described above, the MFP 20x executes the function, which is requested from the computer 30 via the Wi-Fi Direct connection as the directly communicable wireless connection established with the computer 30, namely, the requested function (Step S240) when the radio field intensity of the Wi-Fi Direct connection is within the specified range of the radio field intensity (YES at Step S233), and the authentication of the user of the computer 30 has succeeded (YES at Step S239) when the radio field intensity of the Wi-Fi Direct connection is outside the specified range of the radio field intensity (NO at Step S233), and does not execute when the authentication of the user of the computer 30 has failed (NO at Step S239) when the radio field intensity of the Wi-Fi Direct connection is outside the specified range of the radio field intensity (NO at Step S233). Consequently, it is likely that the MFP 20x does not execute the function requested from the computer 30, which is located at a position outside a specified region based on the position of the MFP 20x itself, when the authentication of the user of the computer 30 has failed. Therefore, the MFP 20x ensures the improved security performance.

For example, even when there is unauthorized access by the computer 30 located outside the building where the MFP 20x is located via the Wi-Fi Direct connection, the MFP 20x limits the executable functions because the radio field intensity of the Wi-Fi Direct connection is weak. Therefore, the MFP 20x ensures reducing the damage caused by unauthorized access to a minimum.

When there is appropriate access by the computer 30 that is located inside the building where the MFP 20x is located via the Wi-Fi Direct connection, and the radio field intensity of the Wi-Fi Direct connection is weak because of a reason such as poor radio wave conditions, the MFP 20x ensures reducing limitation of the executable function because the authentication of the user enables to determine that it is not unauthorized access. Therefore, the MFP 20x ensures improvement of convenience.

The MFP 20x ensures determining a degree of security for each function because it manages whether to execute authentication of a user or not for each function when the radio field intensity of the Wi-Fi Direct connection established with the computer 30 is outside the specified range. Therefore, the MFP 20x ensures improvement of convenience.

While the function execution system 10x includes the authentication server 40 separately from the MFP 20x in this embodiment, the MFP 20x may include the function of the authentication server 40.

While the electronic device of the disclosure is an MFP in the embodiment, the electronic device may be an image forming apparatus other than an MFP such as a printer-only machine, a FAX-only machine, a scanner-only machine, or a copy-only machine, or an electronic device other than an image forming apparatus, such as a PC.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
   a wireless-connection-establishment unit that establishes a directly communicable wireless connection with another device;
   a function execution unit that executes a function; and
   a user authentication unit that executes authentication of a user,
   wherein when a radio field intensity of the wireless connection established with the other device by the wireless-connection-establishment unit is within a specified range, the function execution unit
      executes the function requested from the other device via the wireless connection, and
   wherein when the radio field intensity is outside the specified range, the function execution unit:
      executes the function requested from the other device via the wireless connection when authentication of a user of the other device by the user authentication unit has succeeded; and
      rejects execution of the function requested from the other device via the wireless connection when authentication of the user of the other device by the user authentication unit has failed.

2. The electronic device according to claim 1, further comprising
   an authentication-execution managing unit that manages whether to execute authentication of the user of the other device by the user authentication unit or not for each of functions when the radio field intensity is outside the specified range,
   wherein when execution of the function where in execution of authentication of the user of the other device by the user authentication unit is managed by the authentication-execution managing unit is requested from the other device via the wireless connection, the function execution unit rejects execution of the function requested from the other device via the wireless connection when the radio field intensity is outside the specified range.

3. An electronic device comprising:
   a wireless-connection-establishment unit that establishes a directly communicable wireless connection with another device; and
   a function execution unit that executes a function,
   a function-execution-radio-field-intensity managing unit that manages the specified radio field intensity for each of functions,
   wherein the function execution unit:
      executes the function requested from the other device via the wireless connection when a radio field intensity of the wireless connection established with the other device by the wireless-connection-establishment unit is equal to or more than a specified radio field intensity; and
      rejects execution of the function requested from the other device via the wireless connection when the radio field intensity of the wireless connection established with the other device by the wireless-connection-establishment unit is less than the specified radio field intensity,
   the function-execution-radio-field-intensity managing unit manages a plurality of kinds of specified radio field intensities, and
   the respective plurality of kinds of specified radio field intensities are associated with mutually different functions.

4. The electronic device according to claim 3,
   wherein when the function requested from the other device via the wireless connection is possible to cause the electronic device to be in an unusable state, the function execution unit executes the function when the radio field intensity is equal to or more than the specified radio field intensity, and rejects execution of the function when the radio field intensity is less than the specified radio field intensity, and
   when the function requested from the other device via the wireless connection has no possibility of causing the electronic device to be in an unusable state, the function execution unit executes the function regardless of whether the radio field intensity is equal to or more than the specified radio field intensity or not.

5. The electronic device according to claim 3,
   wherein when the possibility for the function requested from the other device via the wireless connection to cause the electronic device to be in an unusable state is equal to or more than a specified possibility, the specified radio field intensity is stronger than a radio field intensity of a case where the possibility for the function requested from the other device via the wireless connection to cause the electronic device to be in an unusable state is less than the specified possibility.

6. A non-transitory computer-readable recording medium that stores a function execution program for controlling an electronic device, the function execution program causing the electronic device to function as:
   a wireless-connection-establishment unit that establishes a directly communicable wireless connection with another device;
   a function execution unit that executes a function; and
   a user authentication unit that executes authentication of a user,
   wherein when a radio field intensity of the wireless connection established with the other device by the wireless-connection-establishment unit is within a specified range, the function execution unit
      executes the function requested from the other device via the wireless connection, and
   wherein when the radio field intensity is outside the specified range, the function execution unit:
      executes the function requested from the other device via the wireless connection when authentication of a user of the other device by the user authentication unit has succeeded; and
      rejects execution of the function requested from the other device via the wireless connection when authentication of the user of the other device by the user authentication unit has failed.

7. A non-transitory computer-readable recording medium that stores a function execution program for controlling an electronic device, the function execution program causing the electronic device to function as:
   a wireless-connection-establishment unit that establishes a directly communicable wireless connection with another device;
   a function execution unit that executes a function; and
   a function-execution-radio-field-intensity managing unit that manages the specified radio field intensity for each of functions,
   wherein the function execution unit:
      executes the function requested from the other device via the wireless connection when a radio field intensity of the wireless connection established with the other device by the wireless-connection-establishment unit is equal to or more than a specified radio field intensity; and rejects execution of the function requested from the other device via the wireless connection when the radio field intensity of the wireless connection established with the other device by the wireless-connection-establishment unit is less than the specified radio field intensity, the function-execution-radio-field-intensity managing unit manages a plurality of kinds of specified radio field intensities, and the respective plurality of kinds of specified radio field intensities are associated with mutually different functions.

* * * * *